United States Patent
Van Beek et al.

[15] 3,637,529
[45] Jan. 25, 1972

[54] PROCESS FOR PREPARING SUPPORTED CATALYSTS

[72] Inventors: Wilhelmus Petrus Van Beek; Theo Jan Osinga, both of Vlaardingen, Netherlands

[73] Assignee: Lever Brothers Company, New York, N.Y.

[22] Filed: Apr. 6, 1970

[21] Appl. No.: 26,099

[30] Foreign Application Priority Data

Apr. 9, 1969 Luxembourg..............................58,392

[52] U.S. Cl..............................252/459, 252/440, 252/454, 252/466, 252/472, 252/473
[51] Int. Cl. ........................................................B01j 11/24
[58] Field of Search ...............252/430, 466 J, 472, 459, 473, 252/440, 454

[56] References Cited

UNITED STATES PATENTS 3,207,702   9/1965   Flank et al. .........................252/459 X
3,320,182   5/1967   Taylor et al. .........................252/466 J

FOREIGN PATENTS OR APPLICATIONS 6,705,259   10/1968   Netherlands........................252/466 J

*Primary Examiner*—Patrick P. Garvin
*Attorney*—Louis F. Kline, Jr., Melvin H. Kurtz and Edgar E. Ruff

[57] ABSTRACT

A process for preparing a catalyst comprising a metallic catalytic agent on a particulate carrier is disclosed which provides improved uniformity of distribution and fineness of division with narrowness of particle size distribution of the metallic catalytic agent on the carrier. The carrier is impregnated with an aqueous solution of a salt of the metallic catalytic agent and of a source, on heating in aqueous solution, of hydroxyl ions. The impregnated carrier is heated without substantial loss by evaporation of the aqueous solution to precipitate the metal or the particles with uniformity of distribution and fineness of division with narrowness of particle size distribution. The metal is converted by conventional methods to the appropriate active, oxidized or reduced, state. The process is particularly significant with carriers, such as alumina and silica, that in alkaline media are liable to undergo structural charges.

5 Claims, No Drawings

PROCESS FOR PREPARING SUPPORTED CATALYSTS

The present invention relates to a process for the production of a catalyst, which catalyst consists of a metallic catalytic agent in a porous carrier, and to catalysts obtained in this way.

Catalysts which consist of a metallic catalytic agent in a porous carrier have been known for many years. They are often referred to as "supported catalysts." The efficiency of such catalysts depends on a number of properties, such as activity, resistance to poisons, resistance to sintering and selectivity.

It has been found that such properties can be enhanced by using processes for the preparation of the catalyst which improve the uniformity of distribution, fineness of division and narrowness of particle size distribution of the catalytic agent in the porous carrier.

The activity of catalyst depends primarily on the surface area of the catalytic agent in relation to weight of catalyst, which surface must be easily accessible. Uniformity of distribution, fineness of division and narrowness of particle size distribution reduce the likelihood of the particles of metallic catalytic agent coalescing in the carrier. Coalescing is disadvantageous because it reduces the surface area and hence the activity of the metallic catalytic agent.

Also when for full activity the metallic catalytic agent has to be activated by reduction, the final activity depends on the amount of metallic compound reduced during activation. This quantity depends on the physical and chemical state, in particular on uniformity of distribution and fineness of division, of the metallic compound in the carrier.

As with activity, resistance to poisons is affected by the surface area of the catalytic agent. In general the larger the surface area the greater the resistance to poisons, i.e., the more poison required to make the catalyst inactive.

Resistance to sintering similarly depends on uniformity of distribution and fineness of division. Resistance to sintering is particularly important when high temperature activation, for example high-temperature reduction, is necessary. Usually the degree of reduction achieved is greater at higher reduction temperatures. In general with catalysts with high resistance to sintering a higher active surface area can be retained than with catalysts whose resistance to sintering is lower.

In various catalytic processes it is important for the catalyst used to have a high selectivity. For example, in hydrogenation processes, in which two or more double linkages are hydrogenated successively, it is important that hydrogenation is carried out in successive stages in order to obtain partially hydrogenated compounds which are free from more saturated compounds. This selectivity depends on the structure of the catalysts as well as on the nature of the catalytic agent. Thus, for the selective hydrogenation of triglycerides derived from polyunsaturated fatty acids, catalysts with a nickel or copper base are often used, each of which has a specific and different selectivity for this type of hydrogenation. Usually this selectivity increases with the dimension of the pores of the carrier. When these catalysts are produced, it is preferred to start with a carrier whose pores have the required dimension and whose structure is maintained as far as possible throughout these operations. Uniformity of distribution, fineness of division and narrowness of particle size distribution aid maintenance of the required dimensions and structure.

A great many processes for the preparation of such catalysts mounted on carriers have been proposed. The most significant proposals can be classed as follows.

First, processes in which a hydroxide of the catalytic agent is precipitated from an aqueous solution of one of its salts on to the carrier in suspension in this solution by the addition of a basic compound, such as an alkaline carbonate or hydroxide or ammonia. Then the carrier bearing the hydroxide precipitated from the aqueous solution is separated, after which it is washed, if necessary, and dried. The disadvantage of such processes is that a significant proportion of the catalytic agent fails to be precipitated on to the carrier. Furthermore, the quality of the catalysts prepared in this way depends not only on the nature of the reagents but also on the way they are added and the pH and temperature conditions during their addition. It is very difficult, especially on an industrial scale, to obtain catalysts of constant quality.

According to a second type of process, the carrier is impregnated with an aqueous solution of a salt of a metallic catalytic agent, preferably a nitrate, then the impregnated mass is dried and heated to a high temperature to decompose the salt and form the metallic catalytic agent, i.e., corresponding oxide or the free metal. Such a process has the advantage of being easy to carry out and can be carried out in relatively small apparatus in view of the small volume to be treated. It has, however, the major disadvantage that during drying, the aqueous solution containing the salt moves to the outer surface of the carrier so that the catalytic agent is not uniformly distributed in the catalyst obtained.

Both types of process have the disadvantage that it is practically impossible for the catalytic agent to be deposited very finely and with narrow particle size distribution.

In further proposed processes the metal is precipitated from solution on to the carrier by allowing hydroxyl ions to develop in this solution and not by adding such ions as above. German Pat. No. 740,634 describes such a process in which an aqueous solution containing a suitable salt of a metal and urea or a similar nitrogen compound is heated with a carrier. Heating brings about the decomposition of the urea, the pH of the solution is increased by the effect of the freed ammonia and the metal is precipitated on the surface of the carrier particles. Netherlands Pat. application No. 6705259 describes such a process in which the precipitation is effected by using a suspension of the carrier in an aqueous solution of the metal salt and urea. According to German Pat. No. 740,634 this process can in addition be used for systems in which the carrier is impregnated with the aqueous salt and urea solution and then heated.

Such an impregnation process has the advantages over a suspension process that smaller quantities of liquid can be used, simpler apparatus can be used and the procedure is simplified (for instance, no or improved filtration). Although German Pat. No. 740,634 states that when the disclosed process is used even as an impregnation process, no migration of the salt towards the outer surface of the carrier is observed, in practice as with the impregnation process described above (second type of process), the catalytic agent is not distributed entirely uniformly over the carrier. Also the desired fine particle form is only partially obtained.

The aim of the present invention is to provide a process which, while substantially preserving the advantages of the impregnation process, i.e., comparative ease of execution, simple apparatus and small volume, gives improved uniform distribution and fineness of division with narrow particle size distribution of the catalytic agent in the carrier.

According to the invention, a catalyst which consists of a metallic catalytic agent in a porous carrier is prepared in which the catalytic agent is distributed uniformly and in a finely divided state with narrow particle size distribution in the carrier, by impregnating the carrier with an aqueous solution of a salt of the catalytic agent and of a source, when heated in aqueous solution, of hydroxyl ions; and heating the impregnated carrier to allow sufficient hydroxyl ions to develop to precipitate the metal without substantial loss by evaporation of the aqueous solution.

Evaporation can be avoided by heating the impregnated carrier in an atmosphere the partial water vapor pressure of which is approximately equal to that of the impregnated carrier. Too great a difference between the partial water vapor pressures would lead to condensation of water. This would cause an undesirable dilution of the carrier. It has been found that undesirable condensation can be almost completely avoided by using an atmosphere where the partial water vapor pressure exceeds that of the impregnated carrier by 0 to 200 and preferably 0 to 100 mm. Hg, although acceptable results can still be obtained with greater differences in partial pressure.

The water vapor giving the required partial pressure can originate either from the water in the impregnated carrier itself or from extraneous water. In the latter case, for example, water vapor having the required partial pressure can be passed over the carrier. For reasons of convenience, water vapor with a pressure of 1 atmosphere is used and the impregnated carrier is heated to 90°–100° C. This process lends itself particularly well to a continuous method. For example, the carrier can be conveyed with the aid of a screw or other device in a pipe, making sure that there is sufficient free space for the passage of gas between the conveying device or the conveyed impregnated carrier and the wall of the pipe. The carrier is brought to the required temperature while it is being conveyed in the pipe, and simultaneously steam passes into the remaining free space.

An alternative system for ensuring that substantially no loss occurs of the aqueous solution by evaporation is to allow the hydroxyl ions to develop in a sealed vessel. This ensures that water vapor formed does not escape freely thus causing the desiccation of the impregnated carrier which must be avoided. The vessel can be sealed in various ways. Thus the vessel can be completely gastight, in which case an autoclave or similar apparatus capable of resisting the high levels of pressure attained must be used. Alternatively, sufficient impermeability can be ensured by use of a piston flap valve system or a similar system which allows carbon dioxide or any other gas liberated, for example by decomposition of the nitrogen compound, to be released into the atmosphere. Part of the steam is of course carried along but this release can be limited to a permissible degree by ensuring that the valve or piston system closes under a given pressure, for example, by means of a spring.

In a further alternative for making the heating space sufficiently impermeable, the impregnated carrier itself is used as a sealant. In this last case, a process according to which the carrier is conveyed continuously through an oven at a suitable temperature can also be used to advantage. Preferably there the free space between the inside wall of the oven and the impregnated carrier should be kept to a minimum. It is possible for an excessive quantity of water to evaporate from that part of the impregnated carrier which first passes into the heated zone, so that this portion has to be rejected, but for the following carrier this is substantially not the case, because the first portion constitutes a large enough obstacle to the atmosphere. If desired such an apparatus can be equipped with a valve or similar system so that the impregnated carrier leaves the apparatus under counterpressure.

It should be noted that the term "impregnated carrier" here means a homogeneous system obtained by mixing the solid carrier and the aqueous solution in which system all the carrier is moistened but without agitation separate solid and liquid phases cannot readily be detected.

The appropriate amount of aqueous solution to use for a given carrier will depend on the particular nature of the carrier but can readily be determined by experiment: the same amount of carrier as to be used in a process according to the invention is tested with distilled water to determine the quantity of water that moistens all the carrier so that addition of further water causes a separate liquid layer to form. This quantity is the quantity of aqueous solution to be used but with two qualifications.

First, some carriers, in particular some silicas, show an increasing capacity for absorbing water when stood in water. For such carriers both the quantity of distilled water that initially moistens the carrier and the quantity that fully saturates the carrier should be determined. Both should be such that addition of further water causes a separate liquid layer to form. The quantity of aqueous solution to be used is any quantity from the initial to the saturated quantity.

Secondly, the process of the invention can also be applied to systems containing a certain excess of liquid. It is even an advantage to use such systems in cases where the water vapor having the required partial pressure originates from the impregnated carrier, in order to avoid part of the impregnated carrier drying up, since this is undesirable when trying to obtain a catalyst of the undesired quality. The process of the invention can therefore also be used for systems containing more aqueous solution than the quantity determined above but the thickness of the liquid phase initially above the impregnated carrier in the process of the invention must not exceed 5 mm.

"Metallic catalytic agent" here means a metal that has or promotes catalytic activity in the reduced or oxidized state.

Examples of the metal that can be prepared according to the invention include beryllium, copper, gold, zinc, cadmium, mercury, aluminum, titanium, zirconium, hafnium, germanium, tin, lead, vanadium, niobium, tantalum, antimony, bismuth, chromium, molybdenum, tungsten, manganese, iron, cobalt, nickel, ruthenium, rhodium, palladium, osmium, iridium, platinum, thorium, uranium and rare earth metals. Textbooks and general literature provide copious illustrations of catalysts that consist of metallic catalytic agents in porous carriers. Reference can be made for example to "Catalysis," Ed. Emmett, particularly Chap. I, Vol. II, 1955, Reinhold.

Suitable carriers are well known in the literature. Examples include diatomaceous earths (e.g., kieselguhr), pumice, porcelain, silica, asbestos, alumina, charcoal, kaolin, other silicates, infusorial earth, magnesium and barium sulfates and magnesia. Typical surface areas of such carriers lie within the range of 4 to 1,000 sq.m./g.

The process of the invention is particularly advantageous for the production of catalysts in which the carrier is insufficiently stable in alkaline conditions, as in the case of silica and alumina. In the generally acid conditions of the process according to the invention, structural changes in silica and alumina are much less likely than in proposed processes.

Silica or alumina catalysts, useful for instance for the selective hydrogenation of polyunsaturated triglycerides, and should preferably have pores mainly with a diameter of more than 25 A. and preferably more than 80 A. A particular advantage of the invention is that catalysts with such pore structure can be prepared consistently.

Which salt of the metal to use in the process of the invention is mainly determined by the solubility of the salt in water. Water solubilities are given, for example, in "Handbook of Chemistry and Physics," Chemical Rubber Publishing Co. To prepare catalysts with a high-catalytic agent content an aqueous solution with a high concentration of a salt of the required catalytic metal should preferably be used. If no sufficiently soluble salts are available, precipitation can be repeated one or more times. A second factor which influences the choice of metal salt to be used as if washing of the carrier bearing the metallic catalytic agent is required before drying. In industrial production of catalysts it is important to simplify the process as much as possible and therefore not to wash. So a salt should be used which leaves no residue in the catalyst which could have an adverse effect on its properties.

It should be noted that the metallic catalytic agent can be a mixture. A catalyst containing such a mixture can be prepared according to the invention either by using a mixture of salts or more than one precipitation.

There are many convenient sources of hydroxyl ions. All that is required is that hydroxyl ions develop on heating and that the source of hydroxyl ions is water-soluble. Particularly convenient as sources of hydroxyl ions are organic nitrogen compounds that hydrolize when heated in an aqueous medium to form ammonia or primary or secondary amines. Examples of appropriate compounds of this type are urea, but other amides, such as formamide, dimethylformamide, dimethylacetamide and acetamide, are also suitable.

Compounds which are particularly suitable have the general formula:

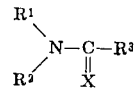

where $R^1$ and $R^2$ each independently are hydrogen or a $C_1$ to $C_5$ alkyl group or, when taken together, are $-(CH_2)_4-$, $-(CH_2)_5-$ or $-(CH_2)_2-O-(CH_2)_2-$; X is O or NH; and $R^3$ is H, or $C_1$ to $C_5$ alkyl group or $-NR^1R^2$.

Another substance which can be used to provide hydroxyl ions is hexamethylene tetramine.

The metal is usually precipitated on the surface of the carrier particles in the form of a hydroxide but sometimes it is preferable to precipitate it in the form of a basic salt, in which case it is advisable to see that the solution contains anions of a suitable acid. These anions can be present just as they are in the aqueous solution e.g., in the form of a catalytic metal salt) or they can be formed during the same decomposition process which liberates the hydroxyl ions. Basic salts which can be precipitated in this process are, for example, basic iron formate(III) in which case the formate ions can for example be formed by means of formamide as the source of hydroxyl ions. Because metal salts are usually expensive, complete or almost complete precipitation of the metal is preferred. Prior proposals have required the use of a considerable excess of the source of hydroxyl ions to the metal salt. The amount used, except on basis of the cost of the source of hydroxyl ions, is not critical and, for instance, 10 times the theoretically necessary quantity of the source of the hydroxyl ions can be used.

In a preferred form of the present invention a sealed vessel is used and the temperature used, for instance to decompose urea or like nitrogen compound, is greater than 100° C. Such a preferred form of the invention has a particular advantage that only slight, if any, stoichiometric excess of source of hydroxyl ions need be used, i.e., ratio of source to metal from 1 to 4:1. This is in addition to the advantages of shorter time and smaller vessels than in other processes.

When the source of hydroxyl ions is, for example, a nitrogen compound, the temperature to which the impregnated mass must be heated to decompose the compound depends on its nature. Usually, this temperature is at least 50° C. but it should preferably be higher. When the process is carried out in a system in which there is low-excess pressure, if any, the heating temperature is preferably 85° to 100° C. In the case of apparatus which allows a fairly high application of excess pressure, the impregnated carrier is preferably heated to an even higher temperature, which greatly speeds up the process. The temperature to be applied in this case depends on the pressure required in the system, but it is usually between 100° and 200° C., although higher temperatures are still acceptable.

After the metal has been precipitated on the surface of the carrier particles, in the form for example of its oxide, hydroxide or basic salt, it is necessary to ensure that it is in the form in which it best displays the appropriate catalytic activity. Various metals are active as oxides or in the free or reduced state. The appropriate form for each metal catalyst is very well known as are ways of converting the precipitate into the appropriate form. Any general inorganic textbook is a suitable guide. In general it will be necessary to dry the carrier containing the precipitate. As indicated above a washing step prior to the drying step can also be included.

Some metals are active as prepared in the oxidized or reduced state but often an activation step is advisable. Suitable activation processes are very well known as is indicated for instance in Kirk Othmer "Encyclopedia of Chemical Technology," Interscience, 1949, Vol. 3, page 267. Examples include thermal treatment at temperatures of 120° to 800° C. and reduction, also often at high temperatures, by means of hydrogen or other reducing agents.

Such activation processes can sometimes be performed without an intermediate drying step, i.e., on the carrier still impregnated with water. Alternatively the carrier particles with the precipitate can be dried, often after washing, and then activated. Activation can also occur, either of dried carrier or of carrier impregnated with water, in a reaction medium on which the catalyst is to act.

Because of this and because the quality of catalysts often diminishes rapidly on storage and because activated catalysts are often pyrophoric, it is often preferable to present the catalysts for storage or for sale, for example, in the nonactivated state. The term "catalyst" used herein therefore means activated catalyst, catalysts that do not require activation before use and nonactivated catalysts that require activation before use.

The invention is illustrated by the following examples (according to the invention) and comparative experiments (not according to the invention):

EXPERIMENT A 15.4 ml. of 3.4 N sodium carbonate were added to a boiling suspension of 20 g. of good quality kieselguhr (93.1 percent ash) in 700 ml. of distilled water immediately followed by the simultaneous addition of 400 ml. of a 10 percent aqueous solution of nickel nitrate and 400 ml. of 3.4 N sodium carbonate. The latter solutions were added at a rate of 2 ml. each per minute, while boiling the reaction mixture continuously during the addition. The final mixture was filtered and the filter cake was washed repeatedly with hot water and dried to give a catalyst having a nickel content of 42.6 percent. The catalyst obtained was activated by reducing it for 4 hr. in a tube furnace at 450° C. and in a hydrogen flow of 60 l./hr./g. nickel.

EXPERIMENT B

A mixture of 62.9 g. of spherical amorphous silica having a specific surface of 170 m.$^2$ per gram and 100 g. of nickel nitrate was ground in a ball mill for 15 min., after which it was placed in a closed, stoppered bottle and heated for 4 days in an oven at a temperature of 75° C. After this melting procedure the mixture was ground again in a ball mill for 15 min. and then decomposed in a nitrogen flow (60 l./hr.) at 300° C. The resulting catalyst, containing 21.8 percent of nickel, was activated as described in experiment A.

EXPERIMENT C

To a stirred suspension of 50 g. of a spherical amorphous silica of the same quality as described in example Ia, an ammoniacal solution containing 75 g. of nickel nitrate—$Ni(NO_3)_2 \cdot 6H_2O$—and having a pH of 9.5 (measured at 20° C.) was added. The suspension with a total volume of 1,000 ml. was boiled for 2 hr. with vigorous stirring. At the end of this period the pH of the suspension was equal to 6 (measured at 100° C.). After filtration the filter cake was washed repeatedly with cold water and dried at 120° C. during 4 hr. and at 200° C. during 16 hr. to give a catalyst with a nickel content of 19.1 percent.

The catalyst thus obtained, containing 19.4 percent of nickel, was activated by heating it in a stream of hydrogen for 4 hr. at 450° C.

The properties of the activated catalysts of experiments A, B and C are shown in table I.

EXAMPLE 1

50 g. of spherical amorphous silica carrier with a specific surface of 200 sq.m./g. are intimately mixed with a solution of 35 g. of nickel nitrate [$Ni(NO_3)_2 \cdot 6H_2O$] and 29 g. of urea in 360 ml. of water.

The impregnated carrier obtained was put into a small 250-ml. dish whose upper opening, which had a surface of about 7 sq. cm., was covered by a glass plate of about 37 g. in weight. The whole was put into an oven and heated for 140 hr. at 88° C. After heating, the carrier bearing the precipitate was dried first for 16 hr. at 120° C., then for 16 hr. at 200° C. to give a catalyst which had a nickel content of about 10.3 percent by weight.

The catalyst was then heated for 4 hr. at 450° C. in a current of hydrogen in order to activate it. The properties of the activated catalyst thus obtained are shown in table I.

EXAMPLE 2

An impregnated carrier, prepared as in example 1, from a solution of 35 g. of nickel nitrate and 29 g. of urea in 360 ml. of water and 50 g. of spherical amorphous silica (specific surface 200 sq.m./g.) was placed in a long trough-shaped boat which was then placed in a glass tube open at both ends. The whole was heated in a tubular oven for 20 hr. at 95° C. while steam was passed through the glass tube. After heating, the mass obtained was dried first for 16 hr. at 120° C. and then for 16 hr. at 200° C. to give a catalyst with nickel content of about 9.6 percent by weight. This catalyst was then activated as in example 1.

The properties of the activated catalyst obtained are shown in table I.

EXAMPLE 3

An impregnated mass prepared as described in example 1 was placed in a thick-walled glass tube sealed at the ends and heated for 5 hr. in an oven at 125° C. After the tube had been cooled and opened, the mass obtained was dried first for 16 hr. at 120° C., then for 16 hr. at 200° C., to give a catalyst with a nickel content of 9.8 percent by weight. The catalyst was activated as described in example 1. The properties of the activated catalyst obtained in this way are shown in table I.

EXAMPLE 4

After mixing 50 g. of a spherical amorphous silica, having a specific surface of 200 sq.m./g., with a solution of 70 g. of nickel nitrate ($Ni(NO_3)_2 \cdot 6H_2O$) and 54 g. of urea in 305 ml. of distilled water, the impregnate obtained was placed in a glass bottle (diameter of the opening 9.3 sq. cm.) covered with a glass plate of the same diameter and a weight of 38.5 g. The closed bottle was heated for 92 hr. in an oven at 92° C. The carrier containing the precipitate was dried for 6.5 hr. at 120° C. and then for 116 hr. at 200° C. to give a catalyst having a nickel content of 19.0 percent. The catalyst was activated by reducing it for 4 hr. in a tube furnace at 450° C. and a hydrogen flow of 60 l./hr./g. nickel. The properties of this activated catalyst are shown in table I.

EXAMPLE 5

After mixing 100 g. of a spherical amorphous silica, having a specific surface of 200 sq.m./g., with a solution of 70 g. of nickel nitrate [$Ni(NO_3)_2 \cdot 6H_2O$] and 120 g. of urea in 630 ml. of distilled water, a 1-l. autoclave was filled for 50 percent of its volume with the impregnate obtained. The closed autoclave was gradually heated during 40 min. to a maximum temperature of 160° C. This temperature was maintained during 30 min., after which the autoclave was cooled to 70° C. over 100 min. The maximum pressure observed was 19 atm. Then the impregnate was removed from the autoclave, and dried for 20 hr. at 200° C. to give a catalyst having a nickel content of 9.8 percent.

Activation of this catalyst was achieved by reducing it for 4 hr. in a tube furnace at 400° C. and in a hydrogen flow at a rate of 60 l./hr./g. nickel. The properties of the activated catalyst are shown in table I.

EXAMPLE 6

After mixing 100 g. of a spherical amorphous silica, having a specific surface of 200 sq.m./g., with a solution of 70 g. of nickel nitrate [$Ni(NO_3)_2 \cdot 6H_2O$] and 60 g. of urea in 800 ml. of distilled water, a 1-l. autoclave was filled for 50 percent of its volume with the impregnate obtained.

The closed autoclave was gradually heated during 48 min. to a maximum temperature of 155° C. This temperature was maintained during 14 min., after which the autoclave was cooled to 50° C. over 138 min. The maximum pressure observed was 6 atm. Then the impregnate was removed from the autoclave, and dried for 24 hr. at 200° C. to give a catalyst having a nickel content of 9.7 percent.

Activation of this catalyst was achieved by reducing it for 4 hr. in a tube furnace at 450° C. and in a hydrogen flow at a rate of 60 l./hr./g. nickel.

The properties of the activated catalyst are shown in table I.

EXAMPLE 7

After mixing 100 g. of a spherical amorphous silica, having a specific surface of 200 sq.m./g., with a solution of 150 g. of nickel nitrate [$Ni(NO_3)_2 \cdot 6H_2O$] and 47 g. of urea in 800 ml. of distilled water, a 1-l. autoclave was filled for 75 percent of its volume with the impregnate obtained. The closed autoclave was gradually heated in 43 min. to a maximum temperature of 175° C. during which the maximum pressure observed was 16 atm. Then the impregnate was removed from the autoclave via a valve, cooled and dried for 64 hr. at 200° C. to give a catalyst having a nickel content of 18.1 percent. Activation of this catalyst was achieved by reducing it for 4 hr. in a tube furnace at 450° C. and in a hydrogen flow at a rate of 60 l./hr./g. nickel. The properties of the activated catalyst are shown in table I.

EXAMPLE 8

After mixing 100 g. of a spherical amorphous silica, having a specific surface of 200 sq.m./g., with a solution of 150 g. of nickel nitrate [$Ni(NO_3)_2 \cdot 6H_2O$] and 47 g. of urea in 800 ml. of distilled water, a 1-l. autoclave was filled for 75 percent of its volume with the impregnate obtained. The closed autoclave was gradually heated in 43 min. to a maximum temperature of 175° C. during which the maximum pressure observed was 16 atm.

The autoclave was then cooled to 50° C. over 60 min. after which the impregnate was removed from the autoclave, washed with hot water and dried for 64 hr. at 200° C. to give a catalyst having a nickel content of 18.7 percent. Activation of this catalyst was achieved by reducing it for 4 hr. in a tube furnace at 400° C. and in a hydrogen flow at a rate of 60 l./hr./g. nickel. The properties of the activated catalyst are shown in table I.

EXAMPLE 9

After mixing 75 g. of a spherical amorphous silica, having a specific surface of 200 sq.m./g., with a solution of 112.5 g. of nickel nitrate [$Ni(NO_3)_2 \cdot 6H_2O$] and 36 g. of urea in 600 ml. of distilled water, a 1-l. autoclave was filled for 75 percent of its volume with the impregnate obtained. The closed autoclave was gradually heated in 52 min. to a maximum temperature of 140° C. This temperature was maintained during 9 min., after which the autoclave was cooled to 50° C. over 98 min. The maximum pressure observed was 13 atm. Then the impregnate was removed from the autoclave, washed with hot water and dried for 48 hr. at 200° C. to give a catalyst having a nickel content of 16.0 percent. Activation of this catalyst was achieved by reducing it for 4 hr. in a tube furnace at 450° C. and in a hydrogen flow at a rate of 60 l./hr./g. nickel. The properties of the activated catalyst are shown in table I.

EXAMPLE 10

After mixing 75 g. of a macroporous silica, having a specific surface of 290 sq.m./g., with a solution of 112.5 g. of nickel nitrate [$Ni(NO_3)_2 \cdot 6H_2O$] and 36 g. of urea in 300 ml. of distilled water, a 1-l. autoclave was filled for 50 percent of its volume with the impregnate obtained. The closed autoclave was gradually heated in 57 min. to a maximum temperature of 160° C. during which the maximum pressure observed was 11.5 atm.

Then the impregnate was removed from the autoclave via a valve, cooled and dried for 24 hr. at 200° C. to give a catalyst having a nickel content of 19.8 percent. Activation of this catalyst was achieved by reducing it for 4 hr. in a tube furnace at 450° C. and in a hydrogen flow at a rate of 60 l./hr./g. nickel. The properties of the activated catalyst are shown in table I.

EXAMPLE 11

After mixing 75 g. of a macroporous silica, having a specific surface of 290 sq.m./g., with a solution of 409 g. of nickel nitrate [Ni(NO$_3$)$_2$·6H$_2$O] and 93 g. of urea in 300 ml. of distilled water, a 1-l. autoclave was filled for 75 percent of its volume with the impregnate obtained. The closed autoclave was gradually heated in 63 min. to a maximum pressure of 160° C., during which the maximum pressure observed was 34 atm. Then the impregnate was removed from the autoclave via a valve, cooled and dried for 88 hr. at 200° C. to give a catalyst having a nickel content of 38.6 percent. Activation of this catalyst was achieved by reducing it for 4 hr. in a tube furnace at 450° C. and in a hydrogen flow at a rate of 60 l./hr./g. nickel. The properties of the activated catalyst are shown in table I.

minute per gram of nickel.

8. These measurements showed that a proportion of the crystallites was >100 A. in size.

EXAMPLE 12

An impregnated mass obtained by mixing 50 g. of spherical amorphous silica (specific surface 200 sq.m./g. with a solution of 30 g. of copper nitrate [Cu(NO$_3$)$_2$·3H$_2$O] and 29 g. of urea in 360 ml. of water was heated for 100 hr. at 88° C. in a closed 250-ml. glass recipient as described in example 1. Then the substance obtained was dried first for 8 hr. at 120° C. and then for 16 hr. at 200° C. to obtain a catalyst with a copper content of 9 percent. The catalyst could be activated at a temperature of 500° C. without suffering appreciable sintering. This ac-

TABLE I

| Properties | Catalyst | | | | | | | | | | | | | | |
|---|---|---|---|---|---|---|---|---|---|---|---|---|---|---|---|
| | Experiment | | | Example— | | | | | | | | | | | |
| | A | B | C | 1 | 2 | 3 | 4 | 5 | 6 | 7 | 8 | 9 | 10 | 11 |
| Percentage nickel (1) | 42.6 | 21.8 | 19.1 | 10.3 | 9.6 | 10.6 | 19.0 | 9.8 | 9.7 | 18.1 | 18.7 | 16.0 | 19.8 | 38.6 |
| Total surface, m.$^2$/g., catalyst (2) | 110 | 120 | 345 | | | | | | | | | | 229 | 368 |
| Specific Ni-surface, m.$^2$/g. Ni total Ni (3) | 68 | 60 | 130 | 225 | 322 | 265 | 225 | 245 | 291 | 238 | 237 | 244 | 214 | 157 |
| Mean size of the Ni crystallites: | | | | | | | | | | | | | | |
| (a) By magnetic measurements (4) | (8) | (8) | | 29 A | 24 A | 26 A | | | | | | | | |
| (b) By hydrogen adsorption (5), A | 58 | 70 | 14 | 15 | 12 | 14 | 17 | 11 | 13 | 13 | 14 | 15 | 15 | 21 |
| (c) By electron microscopy, A | | | | <20 | <20 | <20 | | | | | | | | |
| Degree of reduction percent (6) | 90 | 98 | 42.6 | 75 | 93 | 89 | 91 | 63 | 88 | 74 | 75 | 87 | 76 | 77 |
| Activity (benzene) (7) | 0.5 | | 2.2 | 2.8 | 3.2 | 2.9 | | | | | | | | |

1. The percentage Ni was determined before activation.
2. The total surface m.$^2$/g. of the catalyst was determined by adsorption of nitrogen at 78° K., cf. S. Brunauer, P. H. Emmett and E. Teller, J. Am. Chem. Soc. 60, 309 (1938), and cf. B. G. Linsen, Thesis Delft (Netherlands), 1964.
3. The specific surface of nickel was determined by means of hydrogen chemosorption, cf. J. W. E. Coenen, Thesis Delft (Netherlands) 1958 and B. G. Linsen, loc. cit.
4. Cf. P. W. Selwood "Adsorption and collective paramagnetism," Academic Press Inc., New York, 1962.
5. Cf. J. W. E. Coenen, loc. cit.
6. The degree of reduction (ratio reduced nickel/total amount nickel) was obtained by reducing the composition under standard conditions (4 hr. at 450° C., H$_2$ flow of 60 l./hr.) and determining the amount of nickel metal by treating the catalyst with acid, cf. B. G. Linsen loc. cit.
7. The benzene activity is determined by hydrogenation of gaseous benzene by a known amount of catalyst under standard conditions. The specific reaction rate (= benzene activity) is defined as the number moles benzene converted per tivated catalyst was suitable for the selective hydrogenation of oils and fats.

The details of examples 13 to 34 are given in table II. Examples of reactions which can be catalyzed by the catalysts prepared in examples 13 to 34 are also given in table II.

The procedure used, except where noted in table II, was as follows:

The carrier was impregnated with an aqueous solution of the salt and the precipitate. The impregnate was placed in a glass bottle. The opening of the glass bottle was covered by a glass plate of weight 83.5 g. The bottle was heated for time (hr.) at a temperature T (°C.) and the carrier containing the precipitated metal was heated for 6 hr. at 120° C. and then 24 hr. at 200° C.

It should be noted that a surprising feature of nickel catalysts (e.g., example 14) prepared according to the invention is that they show considerable activity as catalysts for the synthesis of ammonia. Similarly iron catalysts prepared according to the invention show surprisingly increased activity in the synthesis of ammonia.

TABLE II

| | Salt | | Carrier | | Precipitant | | | | | | |
|---|---|---|---|---|---|---|---|---|---|---|---|
| | Formula | Weight/ grams | Name | Weight/ grams | Name | Weight/ grams | Ratio (eq.) to salt | H$_2$O, ml. | t | T | Catalyst for— |
| Example: | | | | | | | | | | | |
| 13 | Ni(NO$_3$)$_2$·6H$_2$O | 17.5 | Silica (1) | 25 | Urea | 3.6 | 1 | 180 | 80 | 92 | Hydrogenation. |
| 14 | Same as above | 17.5 | do | 25 | do | 5.4 | 1.5 | 180 | 80 | 92 | N$_2$+3H$_2$ → 2NH$_3$ |
| 15 | UO$_2$(OOC·CH$_3$)$_2$2H$_2$O | 5.0 | do | 25 | do | 5.7 | 4 | 100 | 80 | 92 | Acetaldehyde to acetic acid. |
| 16 | Cu(NO$_3$)$_2$·3H$_2$O | 11.2 | do | 25 | do | 11.2 | 4 | 120 | 80 | 92 | Solution hydrogenation of oils and fats. |
| 17 | Ce(SO$_4$)$_2$·4H$_2$O | 8.4 | do | 25 | do | 7.5 | 4 | 100 | 80 | 92 | Synthesis of HCN. |
| 18 | VOSO$_4$·5H$_2$O | 21.0 | do | 25 | do | 39.8 | 4 | 150 | 80 | 92 | o-Xylene oxidative. |
| 19 | Cr(NO$_3$)$_3$·9H$_2$O | 27.0 | do | 25 | do | 24.3 | 4 | 110 | 80 | 92 | Dehydrogenation. |
| 20 | AuCl$_3$ | 1.0 | do | 5 | do | 0.6 | 4 | 20(2) | 80 | 92 | Polymerisation of C$_2$H$_2$. |
| 21 | Nd(NO$_3$)$_3$·5H$_2$O | 1.7 | do | 10 | do | 7.5 | 4 | 57(2) | 80 | 92 | Promoter. |
| 22 | Co(NO$_3$)$_2$·CH$_2$O | 17.5 | do | 25 | do | 14.5 | 4 | 115 | 80 | 92 | Hydrogenation, e.g. of benzene. |
| 23 | Fe(NO$_3$)$_3$·9H$_2$O | 26.3 | do | 25 | do | 23.4 | 4 | 120(3) | 80 | 92 | N$_2$+3H$_2$ → 2NH$_3$ |
| 24 | Same as above | 26.3 | do | 25 | HMT(4) | 27.4 | 4 | 145(5) | 80 | 92 | |
| 25 | do | 26.3 | do | 25 | Formamide. | 25 | 4 | 75(6) | 80 | 92 | (13). |
| 26 | do | 26.3 | do | 25 | Acetamide. | 46 | 4 | 125(7) | 80 | 92 | |
| 27 | Ni(NO$_3$)$_2$·6H$_2$O | 17.5 | Norit (8) | 25 | Urea | 14.5 | 4 | 40 | 80 | 92 | Hydrogenation. |
| 28 | Same as above | 17.5 | Silica (9) | 25 | do | 14.5 | 4 | 85 | 80 | 92 | Do. |
| 29 | do | 17.5 | Alumina (10) | 25 | do | 14.5 | 4 | 50 | 80 | 92 | Do. |
| 30 | do | 17.5 | Silica (11) | 25 | do | 14.5 | 4 | 55 | 80 | 92 | Do. |
| 31 | do | 17.5 | TiO$_2$(12) | 25 | do | 14.5 | 4 | 40 | 80 | 92 | Do. |
| 32 | ZrOCl$_2$·8W$_2$O | 42 | Silica (1) | 25 | do | 62.6 | 4 | 100 | 80 | 92 | Dehydration. |
| 33 | {VOSO$_4$·5H$_2$O / SnCl$_4$} | 16.4 / 7.5 ml | do | 25 | do | 61.1 | 4 | 50 | 80 | 92 | Oxidation (e.g. toluene to benzoic acid). |
| 34 | Nickel | 17.5 | do | 25 | do | 14.5 | 11 | 180 | 120 | 75 | |

1. Commercial amorphous spherical silica with a specific surface area of 200 m.²/g.

2. In these examples a smaller glass bottle was used and consequently a smaller glass plate was used than described.

3. The iron nitrate was added in 60 ml. and the urea in 60 ml. acidified to pH 3.5 with nitric acid.

4. Hexamethylene tetramine.

5. The iron nitrate was added in 60 ml. and the HMT in 85 ml. acidified to pH 3.5 with nitric acid.

6. The iron nitrate was added in 50 ml. and the formamide in 25 ml. acidified to pH 3.5 with nitric acid.

solution of sodium hydroxide in order to absorb sulfur trioxide and sulfur dioxide. The amounts of sulfur dioxide and sulfur trioxide were determined simultaneously by titrating known volumes of the sodium hydroxide solution, which was used to absorb the reaction mixture, with as indicator phenolphtalein and methyl orange respectively.

By way of comparison the same oxidation reaction was carried out using a commercial $V_2O_5$—$K_2SO_4$ on silica catalyst, which is especially marketed to be used in the described reaction.

The results are given in table III.

TABLE III

|  | $SO_2$ flow, ml. STP | Air flow, ml. STP | Reaction temperature, °C. | $SO_2$ conversion, percent | Reaction time, minutes | Space velocity, GHSV |
|---|---|---|---|---|---|---|
| 1. Catalyst prepared according to Example 35, 11.2% $V_2O_5$; 12.4% $K_2O$; 76.4% $SiO_2$ 5.0 g. (10.0 ml.) | 27 | 147 | 450 | 98 | 60 | 2,540 |
|  | 27 | 147 | 450 | 98 | 50 | 2,540 |
|  | 108 | 590 | 450 | 97.3 | 11 | 10,160 |
|  | 54 | 295 | 450 | 98 | 25 | 5,080 |
| 2. Commercial catalyst, 8.2% $V_2O_5$; 8.3% $K_2O$; 61.6% $SiO_2$ 5.2 g. (9.9 ml.) 4.6% V; 6.9% K 61.6% $SiO_2$ | 27 | 147 | 450 | 70 | 60 | 2,570 |

7. The iron nitrate was added in 50 ml. and the acetamide in 75 ml. acidified to pH 3.5 with nitric acid.

8. Commercial carbon black with a specific surface of 355 m.²/g.

9. Commercial macroporous silica with a specific surface of 290 m.²/g.

10. Commercial alumina ($Al_2O_3$) prepared by flame hydrolysis of $AlCl_3$ and with a specific surface of 112 m.²/g.

11. Commercial macroporous silica with a specific surface of 30 m.²/g.

12. Commercial titanium oxide prepared by flame hydrolysis of $TiCl_3$ and with a specific surface of 49 m.²/g.

13. Formamide decomposes at room temperature but the pH of the solution is such that it can only be used with metals, such as iron, that precipitate when the pH is at such pH levels.

This low pH precipitation also means that iron salt solutions, as is well known, must be maintained at even lower pH levels by, for example, addition of nitric acid.

EXAMPLE 35

After mixing 75 g. of a spherical amorphous silica, having a specific surface of 200 m.²/g., with a solution of 63 g. of vanadyl sulfate ($VOSO_4 5H_2O$) and 119.4 g. of urea in 315 ml. of distilled water, the impregnate obtained was heated in a glass vessel for 6 hr. at 100° C. in nitrogen-steam flow after which the product was dried for 16 hr. in an oven at 200° C. 36.5 g. of a sieve fraction of 400–600 micron was impregnated with 5.49 g. potassium sulfate ($K_2SO_4$) in 60 ml. of water and dried for 64 hr. at 120° C. and then for 2 hr. at 500° C.

The catalytic activity of the $V_2O_5$—$K_2SO_4$ silica system obtained was determined for the $SO_2$ oxidation process by passing a mixture of air and sulfur dioxide through a tube reactor with a diameter of 12 mm. and a height of 300 mm. filled with 5.0 g. (10.0 ml.) of said catalyst placed at a height between 45 and 133 mm. measured from the bottom of the reactor at temperatures of 400° and 450° C.

The leaving gas mixture was passed through an aqueous

EXAMPLE 36

After mixing 100 g. of a spherical amorphous silica, having a specific surface of 200 m.²/g., with a solution of 70 g. of nickel nitrate [$Ni(NO_3)_2 6H_2O$] and 60 g. of urea in 800 ml. of distilled water, a 1-l. autoclave was filled for 50 percent of its volume with the impregnate obtained.

The closed autoclave was gradually heated during 58 minutes to a maximum temperature of 170° C. This temperature was maintained during 60 minutes, after which the autoclave was cooled to 50° C. over 128 minutes. The maximum pressure observed was 8 atm. Then the impregnate was removed from the autoclave, and dried for 43 hr. at 200° C. to give a catalyst having a nickel content of 9.4 percent. Activation of this catalyst was achieved by reducing it for 4 hr. in a tube furnace at 450° C. and in a hydrogen flow at a rate of 60 l./hr. per g. nickel.

EXAMPLE 37

After mixing 75 g. of a spherical amorphous silica, having a specific surface of 200 m.²/g. with a solution of 112.5 g. of nickel nitrate [$Ni(NO_3)_2 6H_2O$] and 36 g. of urea in 600 ml. of distilled water a 1-l. autoclave was filled for 75 percent of its volume with the impregnate obtained. The closed autoclave was gradually heated in 52 minutes to a maximum temperature of 140° C. This temperature was maintained during 9 minutes and the maximum pressure observed was 13 atm.

Then the impregnate was removed from the autoclave via a valve, cooled and dried for 48 hr. at 200° C. to give a catalyst having a nickel content of 15.9 percent.

EXAMPLE 38

The $ZrO_2/SiO_2$ catalyst prepared according to example 32 was tested on the vapor-phase dehydration of isopropanol.

The results obtained are given in table IV.

Comparative experiment D was prepared by adding dropwise with stirring hot 1N NaOH to a suspension of 25 g. silica (same as used in ex. 32) in an aqueous solution of 42 g. $ZrOCl_2 8HO$.

TABLE IV

| Quantity, grams | Catalyst Code | Composition, percent Zr | Composition, percent $SiO_2$ | Pre-treatment Grinding (1 hour), r.p.m. | Pre-treatment Thermal treatment | Feed isopropanol, ml./hour | Carrier gas $N_2$, l./hour | Yields of propene in percent 100° C. | 130° C. | 160° C. | 190° C. |
|---|---|---|---|---|---|---|---|---|---|---|---|
| 2.0 | Ex. 32 | ca. 22 | ca. 54 | Ball mill 140 | 5 hours at 750° C. in air | 1.90 | 6 | | 47 | 98 | ca. 100 |
|  |  |  |  | do | 20 hours at 750° C. in air | 1.90 | 6 | 2 | 27 | 98 | NM |
| 2.0 | D | 20.8 | 47.6 | Ball mill 140 |  | 1.90 | 6 | <1 | 12 | 52 | 93 |

|  |  |  |  |  |  |  |  | 190° C. | 220° C. | 250° C. | 280° C. | 310° C. |
|---|---|---|---|---|---|---|---|---|---|---|---|---|
| 2.0 | D | 20.8 | 47.6 | do | 5 hours at 750° C. in air | 1.90 | 6 | <1 | 2 | 7 | 18 | 48 |

Table V gives further examples of supported catalysts that can be prepared according to the invention and reactions which the catalysts can be used to catalyze.

11. Dimethylacetamide.
12. Dimethylformamide.
13. Hexamethylene tetramine.

TABLE V

| Example | Metallic catalytic agent | Carrier | Precipitant | Salt | Example of reaction catalyzed |
|---|---|---|---|---|---|
| 39 | Cobalt | Alumina | Urea | $Co(NO_3)_2 \cdot 6H_2O$ | Hydrogenation (1). |
| 40 | do | Magnesium hydroxide carbonate. | do | $Co(NO_3)_2 \cdot 6H_2O$ | Reduction (2). |
| 41 | Iron/nickel | Silica | do | $Ni(NO_3)_2 \cdot 6H_2O$ $Fe(NO_3)_3 \cdot 9H_2O$ | $N_2 + 3H_2 \rightarrow 2NH_3$ |
| 42 | Chromium (oxide) | Alumina | do | $CrCl_3$ | Dehydrogenation (3). |
| 43 | Ruthenium | do | do | $RuCl_3$ | $CO + H_2 \rightarrow CH_4$ |
| 44 | Molybdenum (oxide) iron oxide. | Silica | do | (4) | $CH_3OH \rightarrow HCHO$ (5). |
| 45 | $V_2O_5$ | Alumina | do | $VOSO_4$ | } Oxidation (6). |
| 46 | {Tin oxide | Silica | do | $SnCl_2 \cdot 2H_2O$ | } Oxidation (7). |
|    | {$V_2O_5$ | do | do | $VOSO_4$ | |
| 47 | $Al_2O_3$ | do | do | $Al_2(SO_4)_3$ | Oil washing. |
| 48 | Molybdenum (oxide) bismuth oxide. | do | do | (8) | Acrolein→acrylonitrile. |
| 49 | Molybdenum zinc | do | do | (9) | |
| 50 | Tungsten zinc | do | do | (10) | |
| 51 | Berylium | do | do | $BeSO_4 \cdot 2H_2O$ | |
| 52 | {$Bi_2O_3$ | do | do | $Bi(NO_3)_3 \cdot 5H_2O$ | } Oxidation of $NH_3$. |
|    | {$Fe_2O_3$ | do | do | $Fe(NO_3)_3 \cdot 9H_2O$ | |
| 53 | Cadmium | Alumina | do | $CdCl_2 \cdot H_2O$ | Fatty alcohols from fatty acids. |
| 54 | Cobalt | $TiO_2$ | do | $Co(NO_3)_2 \cdot 6H_2O$ | Hydrogenation. |
| 55 | {Cobalt | Silica | Urea | $Co(NO_3)_2 \cdot 6H_2O$ | |
|    | {Zinc | do | do | $Zn(NO_3)_2 \cdot 6H_2O$ | |
| 56 | {Cobalt | Alumina | do | $Co(NO_3)_2 \cdot 6H_2O$ | } Hydrogenation. |
|    | {Chromium | do | do | $Cr(NO_3)_3 \cdot 9H_2O$ | |
| 57 | Erbium | Silica | do | $Er(NO_3)_2 \cdot 5H_2O$ | |
| 58 | Iron | do | DMA (11) | $Fe(NO_3)_3 \cdot 9H_2O$ | $CO + H_2O \rightarrow CO_2 + H_2$ |
| 59 | do | do | DMF (12) | Same as above | |
| 60 | {Iron oxide | $ZnCO_3$ | Urea | $Ve(NO_3)_3 \cdot 9H_2O$ | } Dehydrogenation. |
|    | {Chromium oxide | $ZnCO_3$ | do | $Cr(NO_3)_3 \cdot 9H_2O$ | |
| 61 | $HfO_2$ | Silica | do | $HfOCl_2 \cdot 8H_2O$ | Cracking of hydrocarbons. |
| 62 | Gallium | do | do | $Ga(NO_3)_2$ | |
| 63 | Manganese oxide | do | do | $MnF_3$ | Oxidation. |
| 64 | Nickel | Kaolin | do | $Ni(NO_3)_2 \cdot 6H_2O$ | $CO \rightarrow CH_4$ |
| 65 | do | Silica | HMT (13) | Same as above | |
| 66 | do | Asbestos | Urea | do | |
| 67 | Thorium | Silica | do | $Th(NO_3)_4 \cdot 6H_2O$ | Fischer-Tropsch. |
| 68 | Ytterbium | do | do | $Yb(NO_3)_3 \cdot 5H_2O$ | |
| 69 | PbO | | | do | Synthesis of methane. |
| 70 | Rhenium | Active coal | do | | Pressure hydrogenation of fuels. |
| 71 | Rhodium | Alumina | do | | Dehydrogenation. |
| 72 | Platinum | Silica | do | | Catalytic reforming. |
| 73 | Iridium | Magnesia | do | | Pressure hydrogenation of coal. |
| 74 | Antimony | | do | | Oxidation of ethylene. |
| 75 | Scandium | Silica | do | $Sc(NO_3)_3 \cdot 9H_2O$ | |
| 76 | Samarium | do | do | $Sm(NO_3)_3 \cdot 5H_2O$ | |
| 77 | Thallium | do | do | $TlCl_3$ | |

1. After activation at 500° C. for 4 hr. with hydrogen such a catalyst is more active for the hydrogenation of benzene than a catalyst prepared by boiling an ammoniacal solution of cobalt nitrate to precipitate the cobalt in an alumina support.

2. For example reduction of azelaic acid dinitrile in ammonia and hydrogen.

3. For example conversion of cyclohexane or n-hexane to benzene.

4. A solution obtained by reducing $Na_2MoO_4$ with iron and HCl and then filtering off excess iron is used.

5. Such a catalyst after activation at 500° C. for 4 hr. in air gives a much higher conversion rate per unit weight molybdenum than a commercial catalyst.

6. For example in the oxidation of o-xylene such a catalyst is more selective than a commercial catalyst.

7. For example in the oxidation of toluene to benzoic acid such a catalyst after activation is more selective and more active than a tin vanadate catalyst prepared according to J. K. Chowdhury and S. C. Chowdhury, J. Indian Chem. Soc., 11, 194 (1934).

8. A solution of $Na_2MoO_4$ is reduced with zinc and filtered. To the filtrate is added $Cr(NO_3)_3 \cdot b9H_2O$.

9. A filtrate after the reduction of $Na_2MoO_4$ with zinc is used.

10. A filtrate after the reduction of $Na_2WO_4$ with zinc is used.

We claim:

1. A process for preparing a catalyst, said catalyst consisting of a metallic catalytic agent on a particulate carrier selected from the class consisting of diatomaceous earths, pumice, porcelain, silica, asbestos, alumina, kaolin, infusorial earth, magnesium sulfate, barium sulfate and magnesia, in which process
   1. said carrier is impregnated with an aqueous solution of
      a. a water-soluble salt of the metallic catalytic agent and
      b. a source of hydroxyl ions selected from the class consisting of hexamethylene tetramine, urea, formamide, dimethyl formamide, acetamide and dimethyl acetamide which on heating in aqueous solution develop hydroxyl ions;
   2. said carrier impregnated with said aqueous solution is heated in an atmosphere whose partial water vapor pressure exceeds the partial water vapor pressure of the carrier by 0 to 200 mm. Hg to develop sufficient hydroxyl ions to precipitate the metal on the surface of the particles of said carrier without substantial loss by evaporation of the aqueous solution; and
   3. said metal on the surface of said particle is converted by drying and activation to the oxidized or reduced state to provide a catalyst consisting of a metallic catalytic agent distributed uniformly and in a finely divided state with narrow particle size distribution on a particulate carrier.

2. A process as claimed in claim 1 in which the carrier impregnated with said aqueous solution is heated in a sealed vessel to develop sufficient hydroxyl ions to precipitate said metal.

3. A process as claimed in claim 2 in which the carrier impregnated with said aqueous solution is heated at a temperature from 100° C. to 200° C. and the mole ratio of said source of hydroxyl ions to said metal is from 1:1 to 4:1.

4. A process as claimed in claim 1 in which the particulate carrier is selected from the class consisting of silica and alumina.

5. A process as claimed in claim 1 in which said metallic catalytic agent is nickel.

* * * * *